(12) United States Patent
Satake et al.

(10) Patent No.: US 9,147,876 B2
(45) Date of Patent: Sep. 29, 2015

(54) METHOD FOR LITHIUM PREDOPING, METHOD FOR PRODUCING ELECTRODES, AND ELECTRIC ENERGY STORAGE DEVICE USING THESE METHODS

(71) Applicant: KRI, Inc., Kyoto-shi (JP)

(72) Inventors: Hisashi Satake, Kyoto (JP); Masanori Fujii, Kyoto (JP); Hajime Kinoshita, Kyoto (JP); Shizukuni Yata, Kako-gun (JP)

(73) Assignee: KRI, Inc., Kyoto-shi (JP)

( * ) Notice: Subject to any disclaimer, the term of this patent is extended or adjusted under 35 U.S.C. 154(b) by 0 days.

(21) Appl. No.: 13/763,879

(22) Filed: Feb. 11, 2013

(65) Prior Publication Data

US 2013/0284988 A1 Oct. 31, 2013

Related U.S. Application Data

(63) Continuation of application No. PCT/JP2011/068321, filed on Aug. 10, 2011.

(30) Foreign Application Priority Data

Aug. 11, 2010 (JP) .................................. 2010-180354
Sep. 28, 2010 (JP) .................................. 2010-217016

(51) Int. Cl.
*H01M 4/88* (2006.01)
*H01M 4/1395* (2010.01)
(Continued)

(52) U.S. Cl.
CPC ............. *H01M 4/1395* (2013.01); *H01G 11/06* (2013.01); *H01G 11/50* (2013.01);
(Continued)

(58) Field of Classification Search
CPC ........... H01M 4/02; H01M 4/04; H01M 4/70; H01M 4/139; H01M 10/04
USPC ................. 252/182.1, 518.1, 502; 429/218.1, 429/231.95, 231.1, 231.8, 303, 221; 427/123
See application file for complete search history.

(56) References Cited

U.S. PATENT DOCUMENTS 5,162,176 A 11/1992 Herr et al.
6,461,769 B1 10/2002 Ando et al.
(Continued)

FOREIGN PATENT DOCUMENTS

JP 59-003806 A 1/1984
JP 62-216171 A 9/1987
(Continued)

OTHER PUBLICATIONS

Tokio Yamabe et al., "The structural analysis of various hydrographene species," Synthetic Metals vol. 145, 2004, pp. 31-36.
(Continued)

*Primary Examiner* — Khanh Tuan Nguyen
(74) *Attorney, Agent, or Firm* — Locke Lord LLP

(57) ABSTRACT

A predoping technique considered as highly practicable is an electrochemical method in which predoping is performed by assembling a battery such that an active material (electrode) and lithium are brought into direct contact with each other or short-circuited therebetween via an electric circuit, and by filling an electrolytic solution in the battery. However, in this case, much time is required, and there are problems such as the handling and the thickness accuracy of an extremely thin lithium metal foil that is not greater than 30 μm thick. By mixing a lithium-dopable material and lithium metal together in the presence of a solvent, such problems can be solved.

11 Claims, 3 Drawing Sheets

(51) Int. Cl.

| | | |
|---|---|---|
| *H01M 4/04* | (2006.01) | |
| *H01M 4/133* | (2010.01) | |
| *H01M 4/1393* | (2010.01) | |
| *H01M 4/36* | (2006.01) | |
| *H01M 4/38* | (2006.01) | |
| *H01M 4/583* | (2010.01) | |
| *H01M 12/00* | (2006.01) | |
| *H01G 11/06* | (2013.01) | |
| *H01G 11/50* | (2013.01) | |

(52) U.S. Cl.
CPC ............ *H01M4/0404* (2013.01); *H01M 4/133* (2013.01); *H01M 4/1393* (2013.01); *H01M 4/362* (2013.01); *H01M 4/382* (2013.01); *H01M 4/583* (2013.01); *H01M 12/005* (2013.01); *Y02E 60/122* (2013.01)

(56) References Cited

U.S. PATENT DOCUMENTS

| | | | |
|---|---|---|---|
| 6,566,011 B1 * | 5/2003 | Takeda et al. | ............... 429/231.1 |
| 6,740,454 B1 | 5/2004 | Ando et al. | |
| 2002/0119373 A1 | 8/2002 | Gao et al. | |
| 2004/0002005 A1 | 1/2004 | Gao et al. | |
| 2004/0146784 A1 | 7/2004 | Gao et al. | |
| 2004/0170898 A1 * | 9/2004 | Shibuya et al. | ............ 429/231.8 |
| 2004/0179328 A1 | 9/2004 | Ando et al. | |
| 2004/0191636 A1 | 9/2004 | Kida et al. | |
| 2005/0130043 A1 | 6/2005 | Gao et al. | |
| 2007/0002523 A1 | 1/2007 | Ando et al. | |
| 2007/0003834 A1 | 1/2007 | Gao et al. | |
| 2008/0057401 A1 * | 3/2008 | Mori et al. | .................... 429/303 |
| 2008/0274408 A1 | 11/2008 | Jarvis | |

FOREIGN PATENT DOCUMENTS

| | | | | |
|---|---|---|---|---|
| JP | 03-233860 A | 10/1991 | | |
| JP | 04-014771 A | 1/1992 | | |
| JP | 04-363863 A | 12/1992 | | |
| JP | 05-067468 A | 3/1993 | | |
| JP | 05-234621 A | 9/1993 | | |
| JP | 08-162126 A | 6/1996 | | |
| JP | 10-294104 A | 11/1998 | | |
| JP | 2002-063892 | * | 2/2002 | .............. H01M 4/02 |
| JP | 2002-313324 A | 10/2002 | | |
| JP | 2002-373657 A | 12/2002 | | |
| JP | 2004-296389 A | 10/2004 | | |
| JP | 2007-500922 A | 1/2007 | | |
| JP | 2007-324271 A | 12/2007 | | |
| JP | 2008-300214 A | 12/2008 | | |
| WO | WO-98/33227 A1 | 7/1998 | | |
| WO | WO-00/07255 A1 | 2/2000 | | |
| WO | WO-03/003395 A1 | 1/2003 | | |
| WO | WO-2004/097867 A2 | 11/2004 | | |
| WO | WO-2004/097867 A3 | 11/2004 | | |

OTHER PUBLICATIONS

S. Yata et al., "Polymer Battery Employing Polyacenic Semiconductor," Synthetic Metals, vol. 18, 1987, pp. 645-648.

Shizukuni Yata et al., "Structure and properties of deeply Li-doped polyacenic semiconductor materials beyond $C_6Li$ Stage," Synthetic Metals, vol. 62, 1994, 153-158.

Shizukuni Yata et al., "Characteristics of deeply Li-doped polyacenic semiconductor material and fabrication of a Li secondary battery," Synthetic Metals, vol. 73, 1995, pp. 273-277.

Kogyozairyo [Engineering Materials], Apr. 1992, vol. 40, No. 5, p. 32-35.

International Search Report dated Nov. 8, 2011, issued for PCT/JP2011/068321.

Supplementary European Search Report dated Apr. 1, 2015 for EP Patent Application No. 11816478.9.

* cited by examiner

US 9,147,876 B2

METHOD FOR LITHIUM PREDOPING, METHOD FOR PRODUCING ELECTRODES, AND ELECTRIC ENERGY STORAGE DEVICE USING THESE METHODS

TECHNICAL FIELD

The present invention relates to a simple and practical method for lithium predoping, a simple and practical method for producing an electrode using an electrode active material predoped with lithium, and an electric energy storage device produced using these methods.

BACKGROUND ART

In recent years, various types of high-energy-density batteries have been actively developed as power sources for small portable devices, such as mobile phones; nighttime electric energy storage systems; household distributed electric energy storage systems based on photovoltaic power generation; electric energy storage systems for electric vehicles; and the like. In particular, since lithium ion batteries have an energy density exceeding 350 Wh/L, and are superior in safety and reliability, such as cycle characteristics, when compared to lithium secondary batteries using lithium metal as a negative electrode, the market for lithium ion batteries as power sources for small portable devices is dramatically growing. Lithium ion batteries use a lithium-containing transition metal oxide, such as $LiCoO_2$, $LiMn_2O_4$, or the like, as a positive electrode active material, and a carbon-based material, such as graphite, as a negative electrode active material. At present, lithium ion batteries are being developed with increasingly higher capacities. However, increasing the capacity of lithium ion batteries by improving practically developed positive electrode oxides and negative electrode carbon-based materials has almost reached its limit. Thus, it is difficult to satisfy demands from device manufacturers for high energy density. Further, in a combination of a high-efficiency engine and an electric energy storage system (for example, in a hybrid electric vehicle), or in a combination of a fuel cell and an electric energy storage system (for example, in a fuel cell electric vehicle), in order for the engine or the fuel cell to be driven with maximum efficiency, it must be driven at a constant output. Thus, in order to handle load fluctuations and energy regeneration on the load side, high-power-discharge characteristics and high-rate charging characteristics are demanded on the electric energy storage system side. In response to these demands, in the area of electric energy storage systems, research and development is being performed to increase the output of lithium ion batteries, which are characterized by a high energy density, and on lithium ion capacitors to increase the energy density of electric double layer capacitors, which are characterized by high output.

On the other hand, regarding electric energy storage devices, such as lithium ion batteries and capacitors, techniques have attracted attention that increase the capacity and voltage of electric energy storage devices by doping lithium ions on active materials in advance (hereinafter referred to as predoping). For example, by applying predoping to a high-capacity material, such as an insoluble and infusible substrate with a polyacene-type skeletal structure as described in Non-Patent Literature 1, Patent Literature 1, Non-Patent Literature 2, Non-Patent Literature 3, and the like, it becomes possible to design an electric energy storage device that sufficiently utilizes its characteristic (high capacity), as described in Non-Patent Literature 4. This makes it possible to meet the demand for higher energy density and output in an electric energy storage device. Predoping is a technique that has long been in practical use. For example, Non-Patent Literature 5 and Patent Literature 2 each disclose an electric energy storage device having high voltage and high capacity, in which an insoluble and infusible substrate with a polyacene-type skeletal structure, which is a negative electrode active material, is predoped with lithium. For lithium-predoping, doping can be electrochemically performed by assembling an electrochemical system in which the electrode to be predoped is used as a working electrode and lithium metal is used as a counter electrode. However, in this method, it is necessary to take the predoped electrode out of the electrochemical system to be installed in a battery or capacitor. Therefore, as a practical predoping method, a method has long been used in which a lithium metal foil is laminated to an electrode containing an active material, thereby contacting them with each other, and after an electrolytic solution is filled, the active material is doped with lithium. This technique is effective for coin-type cells having a small number of relatively thick electrodes. However, in batteries having a structure in which multiple thin electrodes are laminated, or in batteries having a wound-type structure, production steps become complicated, and problems occur with the handling and the like of thin lithium metal. Therefore, a simple and practical predoping method is required.

As a method for solving the above problems, Patent Literature 3 to Patent Literature 6 disclose predoping methods that use a porous current collector (predoping method using porous current corector). For example, Patent Literature 3 discloses an organic electrolyte cell in which pores punching from the front surface to the back surface are provided, a negative electrode active material is capable of reversibly carrying lithium, lithium originating in the negative electrode is carried by electrochemical contact with lithium that is arranged to oppose the negative electrode or positive electrode, and the opposed area of the lithium is not more than 40% of the area of the negative electrode. In this battery, electrode layers are formed on current collectors provided with through-pores. By short-circuiting the lithium metal and a negative electrode arranged in the battery, lithium ions pass through the through-pores of the current collector after an electrolytic solution has been filled, thus doping all of the negative electrodes. An example of Patent Literature 3 discloses an organic electrolyte cell that uses an expanded metal as a current collector provided with through-pores, $LiCoO_2$ as a positive electrode active material, and an insoluble and infusible substrate with a polyacene-type skeletal structure as a negative electrode active material. The negative electrode active material can be easily predoped with lithium ions from the lithium metal arranged in the battery.

Further, a method has been disclosed in which lithium metal powder is mixed in an electrode, or lithium metal powder is uniformly dispersed on a negative electrode as described in Patent Literature 7. After filling a solution therein, a local cell is formed on the electrode, thereby storing lithium uniformly in the electrode. Further, Patent Literature 8 discloses a method in which polymer-coated Li fine particles are mixed in a negative electrode to produce a negative electrode. After assembling a capacitor, the negative electrode is impregnated with an electrolytic solution, and the polymer portion of the polymer-coated Li fine particles is eluted in the electrolytic solution to cause conduction (short-circuiting) between the Li metal and the carbon of the negative electrode, whereby the carbon of the negative electrode is doped with Li.

Each of the above predoping techniques is a technique in which predoping is started in a cell by filling an electrolytic solution after a battery or a capacitor has been assembled. On the other hand, other methods are known, such as a technique in which an electrode is produced using an electrode material containing lithium, by immersing an electrode material in a solution in which n-butyllithium is dissolved in an organic solvent such as hexane, and by reacting the lithium with the electrode material (Patent Literature 9); a method in which lithium is reacted with graphite while the lithium is in a gas phase by an approach called a Tow-Bulb method, thereby causing graphite to contain lithium (Patent Literature 10); and a method in which lithium is mechanically alloyed through a mechanical alloying process (Patent Literature 10).

CITATION LIST

Patent Literature

PTL 1: JP59-3806A
PTL 2: JP3-233860A
PTL 3: WO98/33227
PTL 4: WO00/07255
PTL 5: WO03/003395
PTL 6: WO04/097867
PTL 7: JP5-234621A
PTL 8: JP2007-324271A
PTL 9: JP10-294104A
PTL 10: JP2002-373657A

Non-Patent Literature

NPL 1: T. Yamabe, M. Fujii, S. Mori, H. Kinoshita, S. Yata: Synth. Met., 145, 31 (2004)
NPL 2: S. Yata, Y. Hato, K. Sakurai, T. Osaki, K. Tanaka, T. Yamabe: Synth. Met., 18, 645 (1987)
NPL 3: S. Yata, H. Kinoshita, M. Komori, N. Ando, T. Kashiwamura, T. Harada, K. Tanaka, T. Yamabe: Synth. Met., 62, 153 (1994)
NPL 4: S. Yata, Y. Hato, H. Kinoshita, N. Ando, A. Anekawa, T. Hashimoto, M. Yamaguchi, K. Tanaka, T. Yamabe: Synth. Met., 73, 273 (1995)
NPL 5: Shizukuni Yada, Kougyouzairyou, Vol. 40, No. 5, 32 (1992)

SUMMARY OF INVENTION

Technical Problem

As described above, predoping techniques are important for developing lithium ion batteries with a higher output and capacitors with a higher energy density, and various predoping methods have been proposed. A predoping technique (predoping method using porous foil methodcurrent corector) presently considered to be highly practical will be described with reference to FIG. 1, and a hitherto known electrode or battery production method in which predoping is not performed will be described with reference to FIG. 2. First, during an electrode production step, in the case where a current collector provided with through-pores is used, a step of applying an electrode to a porous foil current collector (specialty) is necessary, which is different from the hitherto known electrode production step shown in FIG. 2. Further, during a cell production step, a battery is assembled in a state where lithium and an electrode containing an active material are short-circuited therebetween via an electric circuit, and an electrolytic solution is filled, whereby predoping is performed in the cell. However, in this case, in order to realize uniform doping for the entire cell, a predoping step including aging for 1 day to several weeks is necessary. In contrast with the hitherto known cell production step shown in FIG. 2, there are problems in that much time is required, and a portion of the metal lithium introduced in the battery remains without being completely predoped, or the portion from which lithium has disappeared through predoping remains as a gap that affects the internal resistance and the like of the battery. Further, there are many problems to be solved in terms of production, including the following. In the case where a current collector provided with through-pores is used, it is necessary to apply an electrode to the porous current collector; and although the method of laminating a lithium metal foil to an electrode containing an active material has relatively high uniformity, it has problems with the thickness precision and handling of an extremely thin lithium metal foil that is no more than 30 μm thick.

On the other hand, as described in the background art, if an active material is immersed in a solution in which alkyllithium is dissolved in an organic solvent such as hexane, to directly predope the active material, uniform predoping is possible. However, compared to the case where lithium metal is used as a lithium source, a large amount of a lithium-containing reagent and a large amount of solvent are necessary; and very complicated steps are required, such as removing the organic solvent, extracting the active material after the reaction, and separating the remaining reagent. Further, the practical use of doping with the Tow-Bulb method (gas phase) or the mechanical alloying process (solid phase) is difficult, because the conditions are complicated, special and large-scale apparatus are required, and further, a critical problem exists in that the material to be predoped is exposed to a high temperature, or the material structure is destroyed by being crushed under an extreme force. An objective of the present invention is to provide a simple and practical method for lithium predoping, and a simple and practical predoped-type electrode production method for solving these problems. The use of these methods allows easy mass production of an electrode containing a material doped with lithium and an electrode predoped with lithium. Further, since a predoped electrode can be obtained during electrode production, it becomes possible to produce a cell without making large changes to existing steps.

Solution to Problem

The present inventors conducted further research while paying attention to the problems of the hitherto known techniques as described above, and found that by mixing a material capable of being doped with lithium and lithium metal together in the presence of a solvent, the material could be easily predoped with lithium in ordinary electrode production steps, and found a practical electrode production method that uses this predoping method.

Specifically, the present invention has the following features and solves the above problems.
(1) A method for lithium predoping comprising mixing a lithium-dopable material and lithium metal together in the presence of a solvent.
(2) The method for lithium predoping according to item (1) above, wherein the mixing is performed by kneading.
(3) The method for lithium predoping according to item (1) or (2) above, wherein the solvent does not comprise an electrolyte salt.
(4) The method for lithium predoping according to any of items (1) to (3) above, wherein the solvent reacts with neither the lithium metal nor a material doped with lithium, and the boiling point of the solvent is not lower than 150° C.

(5) The method for lithium predoping according to any of items (1) to (4) above, wherein the solvent is at least one member selected from the group consisting of cyclic carbonates, lactones, and sulfolanes.

(6) An electrode production method that uses the method for lithium predoping according to any of items (1) to (5) above, wherein an electrode is produced in an atmosphere whose water content is not more than 30 ppm.

(7) An electrode production method that uses the method for lithium predoping according to any of items (1) to (5) above, wherein the lithium-dopable material comprises an amount of solvent that is not less than 10% relative to the weight of the material, and an electrode is produced in an atmosphere whose water content is not more than 100 ppm.

(8) A predoped-type electrode production method comprising:

[1] predoping and slurry preparation steps of kneading a lithium-dopable material and lithium metal together in the presence of a solvent to prepare an applicable slurry;

[2] an application step of applying the slurry to a current collector; and

[3] a drying step of drying the slurry applied to the current collector.

(9) The predoped-type electrode production method according to item (8) above, wherein the predope and slurry preparation steps comprise:

[1-1] a predoping step of kneading a lithium-dopable material and lithium metal together in the presence of a solvent, to dope the lithium-dopable material with lithium; and

[1-2] a slurry preparation step of adding a binder to a mixture from the previous step, and evaporating the solvent from or adding a solvent to the mixture, to prepare an applicable slurry.

(10) The predoped-type electrode production method according to item (8) or (9) above, wherein the solvent does not comprise an electrolyte salt.

(11) The predoped-type electrode production method according to any of items (8) to (10) above, wherein the drying step is performed in an atmosphere whose water content is not more than 30 ppm.

(12) The predoped-type electrode production method according to any of items (8) to (10) above, wherein in the drying step, the drying is performed in an atmosphere whose water content is not more than 100 ppm, such that the content of the solvent becomes not higher than 30% but not lower than 10% relative to the lithium-dopable material.

(13) An electric energy storage device using an electrode comprising a material doped with lithium by the predoping method according to any of items (1) to (5) above.

(14) An electric energy storage device using an electrode obtained by the electrode production method according to any of items (6) to (12) above.

Advantageous Effects of Invention

The predoping method of the present invention is effective in that it makes it possible to easily and uniformly dope a lithium-dopable material with lithium, without using an electrochemical means. Further, the predoped-type electrode production method of the present invention is effective in that it makes it possible to easily and uniformly dope a lithium-dopable material with lithium during electrode production, without using an electrochemical means, and in that by using a predoped-type electrode, it becomes possible to produce a cell, without greatly changing existing cell production steps. By producing an electrode or an electric energy storage device using the material predoped with lithium by this method, or by producing an electric energy storage device using this predoped-type electrode, it becomes possible to solve the problems of hitherto known methods.

DESCRIPTION OF EMBODIMENTS

Figure 1:
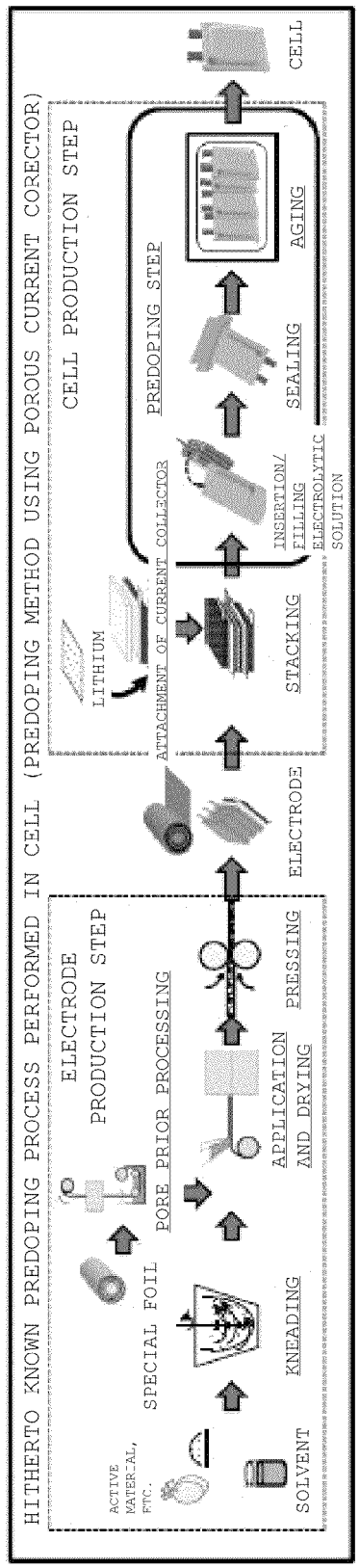
FIG. 1 shows an existing production method that does not comprise a predoping step.

An embodiment of the present invention is described below. The predoping method of the present invention is characterized by mixing a lithium-dopable material and lithium metal together in the presence of a solvent. Further, the predoped-type electrode production method of the present invention is characterized by forming an electrode using material doped with lithium during production of the electrode, using the predoping method. The lithium-dopable material in the present invention is not particularly limited, as long as it is a material that can be doped (although this is expressed using various terms, such as intercalation, insertion, storage, carrying, and alloying, these are collectively referred to as doping in the present invention) with lithium. Examples of a lithium-dopable material to be used as a negative electrode active material include materials reported to be used as negative electrode active materials for electric energy storage devices that use lithium-ion-containing electrolytes, such as lithium-based secondary batteries and capacitors. Specifically, polycyclic aromatic hydrocarbons whose hydrogen/carbon atomic ratio is 0.05 to 0.5, such as insoluble and infusible substrates with a polyacene-type skeletal structure, carbon-based substances, graphite-based substances, conductive polymers, tin or oxides thereof, silicon or oxides thereof, and the like, can be used. The present invention is very effective for materials whose lithium doping/dedoping efficiency is not higher than 85%. Further, examples of a lithium-dopable material to be used as a positive electrode active material include materials reported to be used as positive electrode active materials for electric energy storage devices that use lithium-ion-containing electrolytes, such as lithium-based secondary batteries and capacitors. Specific examples thereof include metal oxides, metal sulfides, conductive polymers, sulfur, and carbon-based materials that are capable of being doped with lithium. In particular, the present invention is very effective for materials that do not contain lithium but are capable of being doped with lithium, such as carbon-based materials, vanadium pentoxide, manganese dioxide, molybdenum disulfide, and iron sulfides.

The form of a lithium-dopable material is not particularly limited and is selected as appropriate from spherical particles, indeterminate-form particles, fibers, and the like. Preferable is a form that allows the material that has been predoped with lithium to be directly used in electrode production, without being subjected to a step such as pulverization. Such a form is determined in consideration of the thickness and density (porosity) of the electrode, intended input-output characteristics, reliability, safety, and the like of the electric energy storage device. For example, the average particle diameter in the case of spherical particles or indeterminate-form particles, or the average fiber length of a fibrous material, is normally not greater than 50 μm, and more preferably, not greater than 30 μm but not smaller than 0.1 μm.

The predoping method of the present invention is characterized by mixing a lithium-dopable material and lithium metal together in the presence of a solvent.

That is, in the predoping method of the present invention, the above-described lithium-dopable material, and lithium metal in the form of a mass, a foil, granules, powder, fibers, or the like, are simply mixed together in the presence of a solvent. Thus, the predoping method of the present invention is a very simple and new, previously nonexistent method. Further, in this predoping method, it is similarly possible to predope not only lithium metal but also, for example, a lithium alloy, such as a lithium aluminum alloy. However, taking the use of a lithium aluminum alloy as an example, a problem exists because aluminum remains after the predoping.

The form of lithium metal to be used in the present invention is not particularly limited, and various forms, such as a mass, a foil, granules, powder, and fibers, can be used. However, when taking the predoping speed into consideration, a form having a large surface area, such as a thin or fine form, is preferable. When considering the handling of lithium metal, productivity, and the influence of the predoping atmosphere, a form having a small surface area is preferable. Consequently, it is preferable to use a lithium metal foil in a foil form or finely-cut pieces of a foil having a thickness not greater than 1 mm but not less than 0.005 mm, and preferably, not greater than 0.5 mm but not less than 0.01 mm; or lithium metal granules or powder whose particle diameter is not greater than 1 mm but not less than 0.005 mm, preferably, not greater than 0.5 mm but not less than 0.01 mm, and more preferably, not greater than 0.5 mm but not less than 0.05 mm. Further, lithium metal coated with a polymer or the like may be used if the whole or a part of the lithium metal comes into contact with the lithium-dopable material while it is being mixed with a solvent as described below.

Naturally, it is preferable to select the solvent to be used in the present invention from solvents that do not react with lithium metal and the material predoped with lithium. Lithium metal and the material predoped with lithium have strong reducibility, and can react with a solvent or can be a catalyst for polymerization of the solvent. However, the reaction here refers to a reaction that continuously proceeds. For example, a solvent can be used when a material doped with lithium reacts with the solvent, a reaction product forms a stable coat on the surface of the material and thereafter inhibits the reaction between the material doped with lithium and the solvent, and thus the reaction does not continually proceed. Alternatively, a solvent can be used when a small amount of a reaction component is contained in a solvent, the entire reaction component is reacted, and the reaction stops. A solvent can also be used when reaction between lithium metal and the material predoped with lithium is slow, and the reaction that has proceeded before the solvent is removed scarcely affects the characteristics of the electric energy storage device.

Further, it is preferable that the solvent to be used in the present invention does not have a critical influence, such as decomposition, on the charging and discharging of an electric energy storage device, such as a battery or a capacitor, produced using the material predoped with lithium. Such examples include solvents that can be used as solvents for electrolytic solutions of electric energy storage devices, such as batteries or capacitors. For example, an organic solvent can be used that consists of one or more types selected from cyclic carbonates, such as propylene carbonate and ethylene carbonate; linear carbonates, such as diethyl carbonate, dimethyl carbonate, and methyl ethyl carbonate; ethers, such as dimethoxyethane; lactones, such as gamma-butyrolactone; sulfolanes; and esters, such as methyl acetate and methyl formate. Although reasons will be described later, the boiling point is preferably not lower than 150° C., and more preferably, not lower than 200° C. In particular, it is preferable that the solvent includes one type or a mixture of two or more types selected from cyclic carbonates, lactones, and sulfolanes. Naturally, it is preferable that the solvent have a low water content. Specifically, when a solvent whose water content is not more than 1,000 ppm, preferably, not more than 500 ppm, and more preferably, not more than 200 ppm, is used, the reaction between lithium metal and water, and between the material doped with lithium and water can be minimized.

According to hitherto known predoping methods considered as being practical, predoping is performed in an electrolytic solution containing a lithium salt, by bringing an electrode containing a lithium-dopable material and lithium metal into direct contact or causing electrical short-circuiting therebetween. That is, the hitherto known predoping methods are performed in a cell after the cell has been assembled. In contrast with these, the present invention is characterized by performing predoping by mixing (especially, kneading) a lithium-dopable material and lithium metal together in the presence of a solvent before forming an electrode. An electrode of the present invention is produced using the material predoped by this method. Here, the solvent to be used during the predoping may contain an electrolyte, such as a lithium salt. However, the handling of the electrolyte remaining in the produced electrode should be taken into consideration and the electrolyte may affect subsequent steps. Therefore, it is preferable that the solvent does not contain an electrolyte, such as a lithium salt.

Many of those skilled in the art have considered that an electrolyte, such as a lithium salt, is indispensable for lithium-predoping. However, in the present invention, the present inventors found that even in a state where an electrolyte, such as a lithium salt, is not contained, predoping proceeds by mixing (especially, kneading) a lithium-dopable material and lithium metal together in the presence of a solvent.

Hereinafter, the predoping method of the present invention and a predoping step in the predoped-type electrode production method of the present invention is described. However, the present invention is not limited by this description to any degree, as long as it includes the basic step of mixing (especially, kneading) a lithium-dopable material and lithium metal together in the presence of a solvent.

First, with respect to a lithium-dopable material that has a form selected as appropriate from among spherical particles, indeterminate-form particles, and fibers, it is preferable to remove water therein as much as possible by drying it. The water content of the material is preferably not more than 1,000 ppm, and more preferably, not more than 200 ppm. The order of mixing the lithium-dopable material, lithium metal, and solvent is not particularly limited. However, it is preferable that the lithium-dopable material and a predetermined amount of the solvent be mixed together, and then lithium metal having a form selected as appropriate from among a mass, a foil, granules, powder, and fibers be added to be mixed (especially, kneaded). At this time, instead of adding the predetermined amount of lithium metal all at once, gradually adding the lithium metal makes the lithium metal more easily dispersed and allows predoping to be performed efficiently in a short period of time.

The ratio of the lithium-dopable material and the solvent varies depending on the physical properties of the material, such as the form and the specific surface area. However, it is preferable that the ratio be adjusted so that the mixture of the lithium-dopable material and the solvent has a clayey consistency or a high viscosity, and that the mixture be kneaded with the lithium metal by so-called hard kneading. The specific solvent amount to reach this state is determined as appropriate depending on the physical properties of the lithium-dopable material, such as the true density, the specific surface area, and the form, and the type of solvent. Normally, the solvent amount is about 10% to 300% relative to the weight of the lithium-dopable material. The kneading can be performed in a general-purpose machine that can mix high-viscosity materials. Kneading can be performed using a mortar for experiments, or using a roll kneading machine, a planetary mixer, a rotation/revolution mixer, or the like, for production. By kneading the lithium metal and the lithium-dopable material together in the presence of a solvent in this manner, it is possible to realize a better contact between the lithium metal and the lithium-dopable material and a better dispersion of them. This makes it possible to perform predoping easily and efficiently in a short period of time.

During the mixing (especially, kneading) described above, it is also possible to add and mix a conductive material, a binder, and the like, in addition to the lithium-dopable material and the lithium metal. In that case, the method is not particularly limited to the method below, and any method that can mix the conductive material, the binder, and the like, can be employed. If the solvent is added in an amount appropriate for predoping, and the predoping of lithium is performed by kneading the mixture, and if the resultant mixture can be applied as a slurry or the like, an application step can be directly started. When the mixture does not yet have a viscosity that allows application thereof, solvent addition or evaporation may be performed in order to make the mixture an applicable slurry.

The above-described predoping step is preferably performed in dry air, an inert gas such as argon, or a vacuum. The water content of the dry air and the inert gas is not more than 250 ppm, and preferably, not more than 100 ppm, or in a vacuum, where the lithium metal can be stably handled. Further, during the mixing (especially, kneading), in order to reduce evaporation of the solvent to facilitate uniform mixing of the lithium metal and to further suppress the predoped material from reacting with water or the like, it is preferable that the boiling point of the solvent to be used be not lower than 150° C., and preferably, not lower than 200° C.

Since the material predoped with lithium obtained in the above manner can be handled in a state where the material contains the solvent, the material is also relatively stable against water in the atmosphere. Thus, the present invention allows mass production of electrodes by using the material predoped by the above method. Other than the fact that a predoped material containing a solvent is used, the electrode can be produced by a known method, such as a known application method, a known sheet forming method, and a known pressing method. However, in the present invention, it is preferable to use an application method that can efficiently produce a thin electrode having a thickness of not greater than 200 μm. Specific examples include a method of adjusting the solvent amount in the predoped material containing the solvent, and applying an obtained paste on a porous body such as a mesh or a foam; and a method of adding a conductive material, a binder, and a solvent to the predoped material to make a slurry, and applying the slurry to a current collector, such as a metallic foil. It is preferable that, with respect to the conductive material and the binder to be used, the water therein is removed as much as possible by drying them as the material predoped with lithium. Further, as the solvent to be added for adjustment or the like of the viscosity during electrode production, the same solvent as that used in predoping, or another solvent that readily dries, can be used. Preferably, as in the case of the solvent used in the predoping, the solvent is selected from solvents that do not react with the material predoped with lithium as described above.

When producing an electrode that uses a material predoped by the predoping method of the present invention, a step of drying the solvent is included. In this drying step, it is sufficient to dry the solvent to a level that allows assembly of an electric energy storage device. For example, it is not necessary to remove the solvent completely if the solvent is dried to a level approximately not higher than 35% relative to the weight of the electrode, and preferably, not higher than 35% relative to the weight of the material doped with lithium. If the drying temperature is too high at this time, lithium that has been predoped may become deactivated due to the heating. Therefore, the temperature is preferably not higher than 160° C., and more preferably, not higher than 120° C., although the specific temperature depends on the predoped material.

It is preferable to perform the electrode production step described above, from the predoping step and thereafter, at a water content of not more than 30 ppm, in particular, not more than 25 ppm. However, when the solvent is allowed to remain in the predoped material to a level not lower than 10% relative to the weight of the predoped material, the production may be performed in an atmosphere whose water content is not more than 100 ppm, for example.

A more specific electrode production method that uses a material predoped by the predoping method of the present invention preferably includes, as a predoped-type electrode production method, [1] a predoping step of kneading a lithium-dopable material and lithium metal together in the presence of a solvent, to dope the lithium-dopable material with lithium (this may simultaneously include the slurry preparation step described below), [2] a slurry preparation step of adding a binder to a mixture from the previous step, and evaporating the solvent from or adding a solvent to the mixture, to prepare an applicable slurry, [3] an application step of applying the slurry to a current collector, and [4] a drying step of drying the slurry applied to the current collector.

That is, the method, etc., preferably includes (a) [1] a predoping step and slurry preparation step of kneading a lithium-dopable material and lithium metal together in the presence of a solvent to prepare an applicable slurry, [2] an application step of applying the slurry to a current collector, and [3] a drying step of drying the slurry applied to the current collector; or (b) [1] a predoping step of kneading a lithium-dopable material and lithium metal together in the presence of a solvent, to dope the lithium-dopable material with lithium, [2] a slurry preparation step of adding a binder to a mixture from the previous step, and evaporating the solvent from or adding a solvent to the mixture, to prepare an applicable slurry, [3] an application step of applying the slurry to a current collector, and [4] a drying step of drying the slurry applied to the current collector. According to these methods, in the predoping step and slurry preparation step of (a) [1] or the predoping step of (b) [1], a new predoping method is used in which a lithium-dopable material and lithium metal are kneaded together in the presence of a solvent, whereby the predoping of lithium is performed during electrode production.

In addition, in consideration of the intended physical properties of the electrode, it is possible to include, as necessary, a pressing step of compressing the electrode to a predetermined electrode density, after the drying step of (a) [3] or (b) [4]. For these steps, existing electrode production steps can be used, although the kneading of lithium, the selection of a solvent to be used in the electrode production, and the adjustment of the atmosphere are necessary.

A preparation step of preparing an applicable slurry including at least the material predoped with lithium, a binder, and a solvent in the predoped-type electrode production of the present invention is described next. Here, an applicable slurry including the material predoped with lithium obtained in the predoping step, a binder, and a solvent is prepared. Further, it is possible to prepare a slurry in which materials necessary for producing an electrode are mixed together, for example, a carbon material, such as carbon black, acetylene black, or graphite; a conductive material, such as a metallic material; and a thickening agent; in addition to the material predoped with lithium, the binder, and the solvent. The order of mixing these materials is determined in consideration of their dispersibility in the slurry, convenience in production, and the like, and they may be mixed in advance in the predoping step.

The binder to be used in the predoped-type electrode production of the present invention is not particularly limited. However, it is important for the binder to be able to bind the material predoped with lithium and not to react with the predoped material as in the case of the solvent used in the predoping. Examples of such a binder include known binders used in negative electrodes for lithium ion batteries, known polymers for gel electrolytes used in lithium ion batteries, and known polymers for solid electrolytes used in lithium ion batteries. Specific examples of the binder include polyvinylidene fluoride (PVDF); poly(vinylidene fluoride-co-hexafluoropropene) (PVDF-HFP) copolymers; fluorocarbon rubbers; SBR; polyether-based polymers; and polyolefins, such as polyethylene and polypropylene. The binder may be soluble, insoluble, or swellable in the solvent in the slurry, and the type and amount thereof may be determined in consideration of its binding property for the material predoped with lithium. Further, it is preferable that water in the binder be removed as much as possible, by drying it for example. Although the mixing amount of the binder is not particularly limited, it is 1% to 30% and preferably, 2% to 20%, relative to the weight of the material predoped with lithium.

When preparing a slurry in the predoped-type electrode production of the present invention, a solvent is newly added, as necessary, in addition to the solvent used for kneading in the predoping step, to adjust the mixture to an applicable viscosity. The solvent here may be the same solvent as that used in the predoping step or may be a different solvent in consideration of drying conditions. However, as in the case of the solvent used in predoping, it is important that the solvent does not react with the material predoped with lithium. With respect to water content, a solvent whose water content is preferably not more than 1,000 ppm, and more preferably, not more than 200 ppm, is used. The solvent used in the predoping step or the solvent used in the slurry preparation step may be determined in consideration of the solubility and swellablity of the binder. The atmosphere in which the slurry is prepared is an inert gas, such as argon or dry air whose water content is not more than 250 ppm, preferably, not more than 100 ppm, or in a vacuum.

The slurry obtained as described above is applied to a current collector. In the present invention, since the material predoped with lithium is applied, it is not particularly necessary to use a porous foil current collector, which has conventionally been required for predoping, and a metallic foil such as an ordinary copper foil or aluminum foil may be used as a current collector.

In the predoped-type electrode production of the present invention, the solvent is dried after the above application step. In this drying, it is sufficient to dry the solvent to a level that allows assembly of an electric energy storage device. For example, it is not necessary to remove the solvent completely if the solvent is dried to a level of about not higher than 30% relative to the weight of the electrode, and preferably, not higher than 30% relative to the weight of the material predoped with lithium. If the drying temperature is too high at this drying step, lithium that has been predoped may become deactivated due to the heating. Therefore, the temperature is preferably not higher than 160° C., and more preferably, not higher than 120° C., although the specific temperature depends on the material predoped with lithium and the solvent that has been used. It is preferable to perform the drying step at a water content of not more than 30 ppm, in particular, not more than 25 ppm. However, when the solvent is allowed to remain in the predoped material to a level not lower than 10% relative to the weight of the predoped material, production may be performed in an atmosphere whose water content is not more than 100 ppm, for example.

The electrode obtained by the predoped-type electrode production method of the present invention can be combined with a separator, a nonaqueous electrolytic solution, and so on, in which a lithium salt is dissolved in a nonaqueous solvent, to form an electric energy storage device, such as a lithium ion battery or a lithium ion capacitor. In this case, when the predoped-type electrode is a negative electrode, it is combined with a positive electrode, and when the predoped-type electrode is a positive electrode, it is combined with a negative electrode. Since a cell is produced using the predoped-type electrode that has been predoped in the electrode production, production is possible through steps similar to those for an ordinary existing production method in which predoping is not performed.

It is preferable that the electric energy storage device of the present invention use a nonaqueous electrolytic solution in which a lithium salt is dissolved in a nonaqueous solvent. As a nonaqueous electrolytic solution used in the present invention, a nonaqueous electrolytic solution containing a lithium salt can be used. The nonaqueous electrolytic solution is determined as appropriate, in accordance with the type of the positive electrode material, characteristics of the negative electrode material, usage conditions, such as the charging voltage, and the like. As the nonaqueous electrolytic solution containing a lithium salt, for example, an organic solvent can be used that consists of one or more types selected from propylene carbonate, ethylene carbonate, diethyl carbonate, dimethyl carbonate, methyl ethyl carbonate, dimethoxyethane, gamma-butyrolactone, methyl acetate, methyl formate, and the like, in which a lithium salt such as $LiPF_6$, $LiBF_4$, and $LiClO_4$ is dissolved. Further, although the concentration of the electrolytic solution is not particularly limited, about 0.5 mol/L to 2 mol/L is practical in general. Naturally, it is preferable to use an electrolytic solution whose water content is not more than 100 ppm.

The separator for the electric energy storage device in the present invention is not particularly limited. Examples thereof include polyethylene microporous membranes, polypropylene microporous membranes, laminated films of polyethylene and polypropylene, woven fabrics and nonwoven fabrics formed of cellulose, glass fiber, polyaramid fiber, polyacrylonitrile fiber, and the like. The separator can be determined as appropriate in accordance with its objectives and situations.

The form of the electric energy storage device of the present invention is not particularly limited, and can be determined as appropriate in accordance with its objectives, and may be coin-shaped, cylindrical, prismatic, film-shaped, and the like.

By using the method for lithium predoping and the electrode production method of the present invention, it becomes possible to produce, easily and in a short period of time, an electric energy storage device, such as a lithium ion battery, a lithium ion capacitor, or the like, to which predoping is applied.

Figure 2:
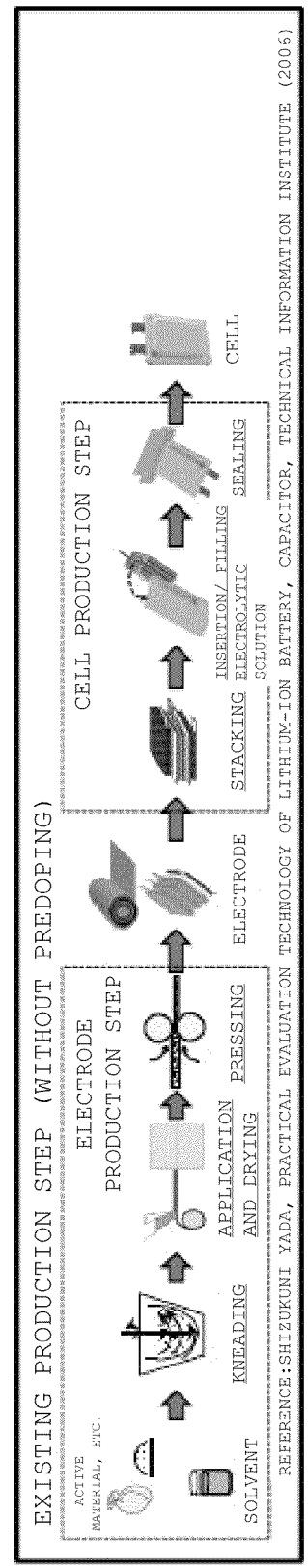
FIG. 2 shows a production method that uses a hitherto known predoping method (predoping method using porous foil methodcurrent corector).
Figure 3:
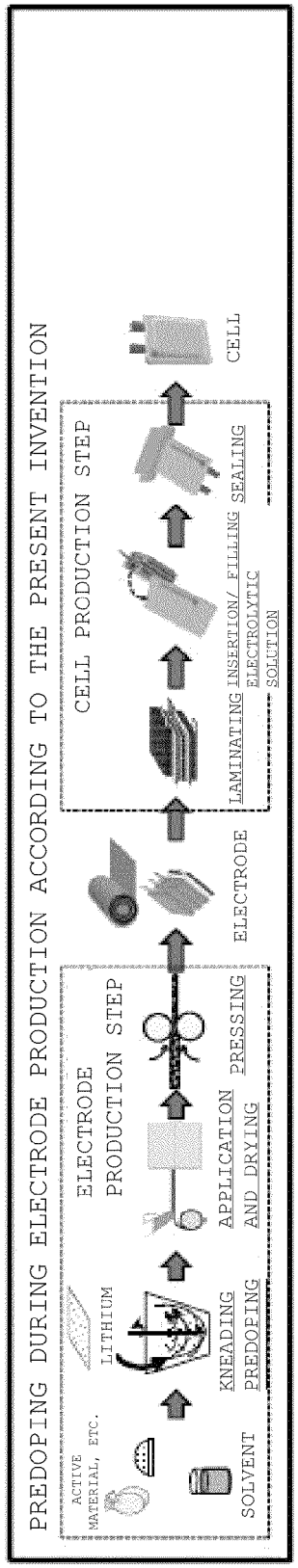
FIG. 3 shows an example of a production method of the present invention.

A more specific description is given next. According to one example of the predoped-type electrode production method of the present invention shown in FIG. 3, it is possible to uniformly predope a positive or negative electrode material with lithium in a short period of time, by simply adding lithium metal and kneading the mixture, in the step of kneading an active material, a conductive material, and the like with a solvent in the existing steps shown in FIG. 2, without a predoping step. Further, also in the cell production step, by using the predoped-type electrode obtained by the production method of the present invention, it is possible to produce a cell, using steps similar to those of the existing production method. Further, there is no step of applying an electrode to a porous foil current collector (specialty), compared to a currently performed technique of having the predoping performed in a cell (FIG. 1). Also in the cell production, an aging step associated with predoping is not required. Thus, features of the production method of the present invention include the following: 1) although selecting a solvent to be used in electrode production and adjusting the atmosphere are necessary, electrode production using existing steps becomes possible; 2) since a predoped electrode can be obtained during the electrode production, cell production using existing steps becomes possible; and 3) an ordinary copper foil or aluminum foil current collector can be used. Further, since predoping is completed during the electrode production, the hitherto known predoping step during cell production, which has conventionally been necessary when performing predoping in a cell, is not required. Therefore, it becomes possible to produce, easily and in a short period of time, an electric energy storage device, such as a lithium ion battery, a lithium ion capacitor, or the like, to which predoping is applied.

Examples are shown below to further clarify the features of the present invention. However, the present invention is not limited by the Examples to any degree.

EXAMPLES

Example 1

Synthesis of Polycyclic Aromatic Hydrocarbons: PAHs

Coal-based isotropic pitch (softening point 280° C.) was pulverized in a coffee mill to obtain a pitch raw material whose particle size was not greater than 1 mm. 1,000 g of the pitch powder was placed on a stainless-steel plate to be set in an electric furnace (effective internal furnace dimensions: 300 mm×300 mm×300 mm), to allow a thermal reaction. The thermal reaction was performed in a nitrogen atmosphere, and the nitrogen flow was set to 10 liters/minute. For the thermal reaction, the temperature was raised at a rate of 100° C./hour from room temperature to 680° C. (temperature in the furnace), then, this temperature was maintained for 4 hours. The temperature was then cooled to 60° C. by natural cooling, and the reaction product was taken out of the electric furnace. The obtained product did not maintain the form of the raw material and consisted of an insoluble and infusible solid having an indeterminate form. The yield was 790 g (79 wt %).

The obtained product was pulverized in a jet mill, and sorted so as to have an average particle size of 4 μm, whereby polycyclic aromatic hydrocarbons (hereinafter referred to as PAHs) were obtained. Using the negative electrode material, elemental analysis (apparatus used in the measurement: a PE3400 series II, CHNS/O elemental analyzer, produced by PerkinElmer Inc.) and specific surface area measurement by a BET method (apparatus used in the measurement: NOVA1200, produced by Yuasa Ionics Co. Ltd. (presently Sysmex Corp.)) were performed. The atomic ratio of hydrogen to carbon was H/C=0.195, and the specific surface area was 11 $m^2$/g.

A prototype of an electrode was produced using the obtained PAHs, acetylene black as a conductive material, PVDF as a binder, and lithium metal as a counter electrode. The electrolytic solution was a solvent consisting of ethylene carbonate and methyl ethyl carbonate mixed at a weight ratio of 3:7, in which $LiPF_6$ was dissolved at a concentration of 1 mol/L. Then, doping/dedoping of lithium was electrochemically performed. The doped amount was 1,134 mAh/g, the dedoped amount was 855 mAh/g, and the obtained PAHs were a lithium-dopable material. Further, the initial efficiency was 75%.

(Predoping)

The above PAHs and acetylene black were vacuum-dried at 170° C. for 10 hours. Then, 0.5 g of the PAHs and 0.05 g of acetylene black were mixed together in an argon dry box in which water content was not more than 1 ppm, propylene carbonate (boiling point: 242° C.) whose water content was not more than 30 ppm was added thereto in an amount of 0.572 g, and the mixture was mixed using a mortar. To the obtained clayey mixture, pieces cut out of a 30 μm lithium metal foil were added in an amount of about 0.006 g each time, and the mixture was kneaded. Only after the added piece of the lithium metal foil completely disappeared, the next piece of the lithium metal foil was added. In this manner, a total of 0.05 g of lithium metal (corresponding to 380 mAh/g for the weight of the PAHs) was kneaded. When the kneading was completed, the added lithium metal foil had completely disappeared. The kneading time was 40 minutes, and a practical predoping amount of 380 mAh/g could be predoped in a short period of time.

The mixture of the predoped PAHs, acetylene black, and propylene carbonate obtained above was applied to a stainless-steel mesh (17 mm ϕ), to be used as an evaluation electrode. The electrode production was performed in an argon dry box in which water content was not more than 1 ppm. Two evaluation electrodes were produced and one of them was directly used in the electrochemical measurement described below, and the other was used to measure the amount of the solvent contained in the electrode. For measuring the amount of the solvent contained in the electrode in the present invention, the electrode was dried while the weight thereof was measured on a 120° C. hot plate, and the amount of the solvent was calculated based on the difference between the weight when the weight reduction stopped and the weight before drying. In this case, weight reduction stopped after drying for not less than 10 minutes. As a result, in the present example, the solvent (propylene carbonate) was contained in an amount of 99% relative to the weight of the PAHs.

The electrochemical measurement was performed in the following manner. A 2-electrode cell that uses an evaluation electrode (containing PAHs in an amount of 12.8 mg) as a working electrode and lithium metal as a counter electrode was produced, in which the working electrode, a 180-μm glass mat, and lithium metal were stacked. As an electrolytic solution, a solvent consisting of ethylene carbonate and methyl ethyl carbonate mixed at a weight ratio of 3:7, in which $LiPF_6$ was dissolved at a concentration of 1 mol/l, was filled in the cell. The potential immediately thereafter of the working electrode (an electrode composed of the predoped material) relative to the lithium metal was measured. In the present example, the potential was 129 mV vs. $Li/Li^+$. Since the potential of PAHs not doped with lithium was about 3 V vs. $Li/Li^+$ and 129 mV was observed immediately after the assembly, it was confirmed that the PAHs were doped with lithium by the above predoping method.

Examples 2 to 4

The mixture of the predoped PAHs, acetylene black, and propylene carbonate obtained in Example 1 was applied to a stainless-steel mesh (17 mm ϕ), to be used as an evaluation electrode. Other than the fact that propylene carbonate was dried to a corresponding predetermined amount shown in Table 1, the same measurement as that in Example 1 was performed. The drying temperature at this moment was set to not higher than 120° C., and the amount of the solvent contained in the electrode was adjusted by varying the time. This test was used to examine resistance against dryness (a necessity for the solvent to be contained in the electrode), which is important for making an electrode out of the material predoped by the method of the present invention. Drying was performed in an argon dry box in which the water content was not more than 1 ppm. The results are shown in Table 1. It was confirmed that, in the argon dry box in which the water content was not more than 1 ppm, even when the solvent was dried to 0%, the doping of lithium was successfully performed in an electrochemically active state.

Example 5

The PAHs obtained in Example 1 and acetylene black were vacuum-dried at 170° C. for 10 hours. Then, 0.5 g of the PAHs and 0.05 g of acetylene black were mixed together in an argon dry box in which the water content was not more than 1 ppm, and gamma-butyrolactone (boiling point: 202° C.) whose water content was not more than 30 ppm was added thereto in an amount of 0.508 g, and the mixture was mixed using a mortar. To the obtained clayey mixture, pieces cut out of a 30 μm lithium metal foil were added in an amount of about 0.006 g each time, and the mixture was kneaded. Only after the added piece of the lithium metal foil completely disappeared, the next piece of the lithium metal foil was added. In this manner, a total of 0.05 g of lithium metal (corresponding to 380 mAh/g for the weight of the PAHs) was kneaded. When the kneading was completed, the added lithium metal foil had completely disappeared. The kneading time was 40 minutes, and predoping was possible in a short period of time.

The mixture of the predoped PAHs, acetylene black, and gamma-butyrolactone obtained above was applied to a stainless-steel mesh (17 mm ϕ), to be used as an evaluation electrode. The electrode was dried at 120° C., and the amount of gamma-butyrolactone contained in the electrode was made to be 8 wt %. Then, the same measurement as that in Example 1 was performed. The results are shown in Table 1. It was confirmed that, even when gamma-butyrolactone was used, the doping of lithium can be performed in an electrochemically active state as in the case of propylene carbonate.

Example 6

Other than the fact that N-methylpyrrolidone whose water content was not more than 200 ppm (amount used: 0.587 g) was used as a solvent, the same measurement as that in Example 1 was performed. In this case, the initial potential was 530 mV vs. $Li/Li^+$. The result is shown in Table 1. Although the PAHs were doped with lithium, lithium in an electrochemically active state was less than that in Example 1. This is because N-methyl pyrrolidone reacts with lithium. Compared to the case where propylene carbonate or gamma-butyrolactone was used, although the PAHs were doped with lithium, the potential of the doped PAHs relative to the lithium metal was higher.

Example 7

Other than the fact that diethyl carbonate (boiling point: 127° C.) whose water content was not more than 30 ppm was used as a solvent, the same measurement as that in Example 1 was performed. In this case, the PAHs and acetylene black were mixed together, then diethyl carbonate was added thereto, and the resultant mixture was mixed in a mortar. At the stage of adding lithium metal, the solvent rapidly evaporated, and it was difficult to mix the lithium metal in the presence of a sufficient amount of solvent for the present experiment. As a result, the initial potential was 896 mV vs. $Li/Li^+$; and compared to the case where propylene carbonate or gamma-butyrolactone was used, although the PAHs were doped with lithium, the potential of the doped PAHs relative to the lithium metal was higher.

TABLE 1

| | Solvent | Pre-doping atmosphere | Water content in atmosphere | Solvent amount relative to predoped material | Initial potential |
|---|---|---|---|---|---|
| Example 1 | Propylene carbonate | Argon | Not more than 1 ppm | 99% | 129 mV |
| Example 2 | Propylene carbonate | Argon | Not more than 1 ppm | 68% | 138 mV |
| Example 3 | Propylene carbonate | Argon | Not more than 1 ppm | 2% | 190 mV |
| Example 4 | Propylene carbonate | Argon | Not more than 1 ppm | 0% | 201 mV |
| Example 5 | Gamma-butyrolactone | Argon | Not more than 1 ppm | 8% | 264 mV |
| Example 6 | N-methyl pyrrolidone | Argon | Not more than 1 ppm | 102% | 530 mV |
| Example 7 | Diethyl carbonate | Argon | Not more than 1 ppm | 27% | 896 mV |

Examples 8 to 12

The PAHs obtained in Example 1 and acetylene black were vacuum-dried at 170° C. for 10 hours. Then, 0.5 g of the PAHs and 0.05 g of acetylene black were mixed together in a dry room (dry air atmosphere) in which the water content was 100 ppm, propylene carbonate (boiling point: 242° C.) whose water content was not more than 30 ppm was added thereto in an amount of 0.580 g, and the mixture was mixed using a mortar as in the case of Example 1. To the obtained clayey mixture, pieces cut out of a 30 μm lithium metal foil were added in an amount of about 0.006 g each time, and the mixture was kneaded. Only after the added piece of the lithium metal foil completely disappeared, the next piece of the lithium metal foil was added. In this manner, a total of 0.05 g of lithium metal (corresponding to 380 mAh/g for the weight of the PAHs) was kneaded. When the kneading was completed, the added lithium metal foil had completely disappeared. The kneading time was 40 minutes, and predoping was possible in a short period of time. As in the case of Example 1, the mixture of the PAHs, acetylene black, and propylene carbonate was applied to a stainless-steel mesh (17 mm φ), to be used as an evaluation electrode. Other than the fact that propylene carbonate was dried to a corresponding predetermined amount, the same measurement as that in Example 1 was performed. This test was performed in a dry room in which the water content was 100 ppm (dry air), and was performed to examine the atmosphere during the predoping method and the electrode production of the present invention. The results are shown in Table 2. It is shown that predoping is possible even in a dry room in which the water content is 100 ppm (dry air atmosphere), but that when the amount of the solvent contained in the electrode is less than 10% relative to the doped material in the drying step, the amount of lithium in an electrochemically active state is reduced.

TABLE 2

| | Solvent | Pre-doping atmosphere | Water content in atmosphere | Solvent amount relative to predoped material | Initial potential |
|---|---|---|---|---|---|
| Example 8 | Propylene carbonate | Dry air | 100 ppm | 104% | 194 mV |
| Example 9 | Propylene carbonate | Dry air | 100 ppm | 35% | 315 mV |
| Example 10 | Propylene carbonate | Dry air | 100 ppm | 14% | 290 mV |
| Example 11 | Propylene carbonate | Dry air | 100 ppm | 0% | 984 mV |
| Example 12 | Propylene carbonate | Argon | 100 ppm | 0% | 576 mv |

Examples 13 to 16

The mixture of the predoped PAHs, acetylene black, and propylene carbonate obtained in Example 1 was applied to a stainless-steel mesh (17 mm φ), to be used as an evaluation electrode. Propylene carbonate was dried at a temperature not higher than 120° C. to a corresponding predetermined amount by adjusting the time. Then, the electrode was left in the corresponding atmosphere shown in Table 3 for 30 minutes. This test was to examine the resistance of doped lithium when it is exposed to an atmosphere whose water content was not more than 30 ppm. The results are shown in Table 3. In either the argon atmosphere or the dry air atmosphere, when the water content is not more than 30 ppm, it is possible to handle the material or electrode doped with lithium in an electrochemically active state.

TABLE 3

| | Solvent | Pre-doping atmosphere | Water content in atmosphere | Solvent amount relative to predoped material | Initial potential |
|---|---|---|---|---|---|
| Example 13 | Propylene carbonate | Argon | 16 ppm | 13% | 200 mV |
| Example 14 | Propylene carbonate | Argon | 24 ppm | 0% | 163 mV |
| Example 15 | Propylene carbonate | Dry air | 12 ppm | 18% | 189 mV |
| Example 16 | Propylene carbonate | Dry air | 12 ppm | 0% | 233 mV |

Examples 17 to 20

The mixture of the predoped PAHs, acetylene black, and propylene carbonate obtained in Example 1 was applied to a stainless-steel mesh (17 mm φ), to be used as an evaluation electrode. Other than the fact that propylene carbonate was dried at a corresponding predetermined temperature to a remaining solvent amount of 0%, the same measurement as that in Example 1 was performed. The drying temperatures in Examples 17, 18, 19, and 20 were 140° C., 150° C., 160° C., and 170° C., respectively. This test was used to examine the drying temperature in the drying step, which is important for producing an electrode out using the material predoped by the method of the present invention. Drying was performed on a hot plate at a corresponding predetermined temperature in an argon dry box in which the water content was not more than 1 ppm. The results are shown in Table 4. It was confirmed that, in drying at a temperature up to 170° C., the doping of lithium was successfully performed in an electrochemically active state.

TABLE 4

| | Solvent | Predoping atmosphere | Water content in atmosphere | Drying condition | Solvent amount relative to predoped material | Initial potential |
|---|---|---|---|---|---|---|
| Example 4 | Propylene carbonate | Argon | Not more than 1 ppm | 120° C., 10 min. | 0% | 201 mV |
| Example 17 | Propylene carbonate | Argon | Not more than 1 ppm | 140° C., 10 min. | 0% | 240 mV |
| Example 18 | Propylene carbonate | Argon | Not more than 1 ppm | 150° C., 10 min. | 0% | 286 mV |
| Example 19 | Propylene carbonate | Argon | Not more than 1 ppm | 160° C., 10 min. | 0% | 290 mV |
| Example 20 | Propylene carbonate | Argon | Not more than 1 ppm | 170° C., 10 min. | 0% | 380 mV |

Figure 4:
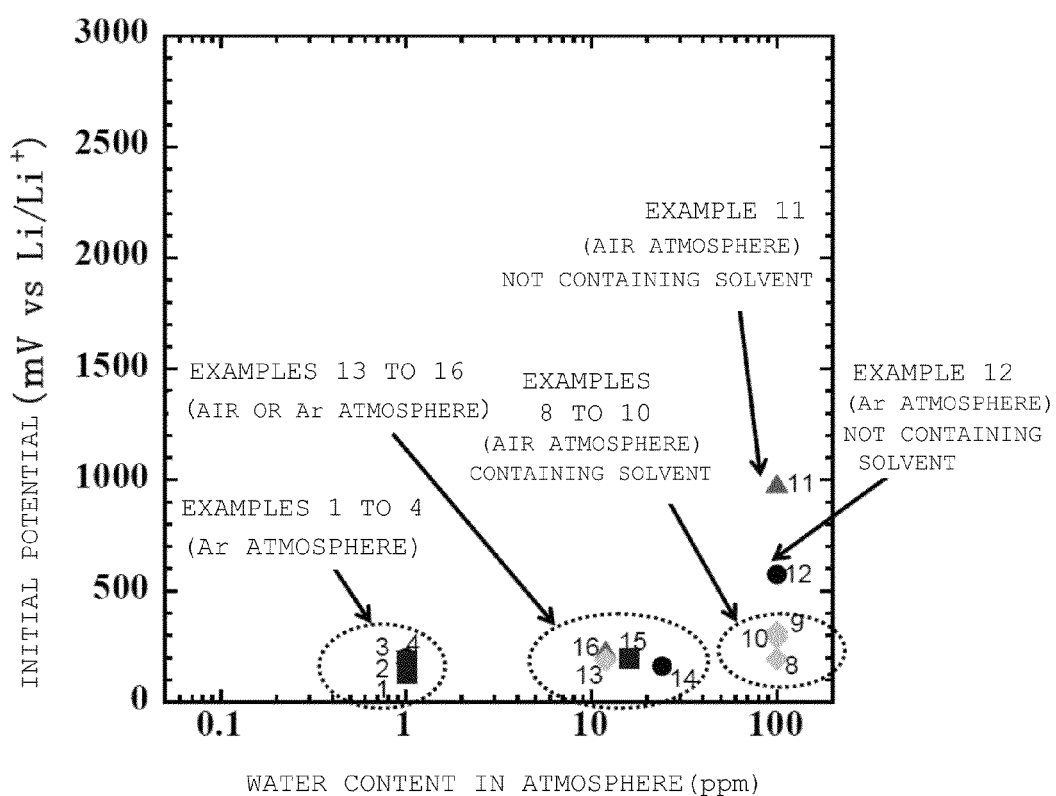
FIG. 4 illustrates Examples and shows the relationship between the predoping atmosphere and the initial potential of the doped materials.

The above results are summarized in FIG. 4. In FIG. 4: the points denoted by squares represent the results of cases in which the atmosphere was argon and solvent was contained; the points denoted by circles represent the results of cases in which the atmosphere was argon and no solvent was contained; the points denoted by rhomboids represent the results of cases in which the atmosphere was dry air and solvent was contained; and the point denoted by a triangle represents the result of the case in which the atmosphere was dry air and no solvent was contained. Further, the numbers in FIG. 4 are the numbers of the respective Examples. It is known that, in the present invention, it is preferable that the atmosphere for the predoping method and electrode production has a water content of not more than 100 ppm when a solvent is contained, and has a water content of not more than 30 ppm when the solvent has completely dried.

Example 21

Predoped-Type Electrode Production

The PAHs obtained in Example 1 and acetylene black were vacuum-dried at 170° C. for 10 hours. Then, 0.5 g of the PAHs and 0.05 g of acetylene black were mixed together in an argon dry box in which the water content was not more than 1 ppm, propylene carbonate (boiling point: 242° C.) whose water content was not more than 30 ppm was added thereto in an amount of 0.68 g, and the mixture was mixed using a mortar. To the clayey mixture, pieces cut out of a 30 μm lithium metal foil were added in an amount of about 0.006 g each time, and the mixture was kneaded. Only after the added piece of lithium metal foil completely disappeared, the next piece of lithium metal foil was added. In this manner, a total of 0.05 g of lithium metal (corresponding to 380 mAh/g for the weight of the PAHs) was kneaded (predoping step). When the kneading was completed, the added lithium metal foil had completely disappeared. The kneading time was 40 minutes and a practical predoping amount of 380 mAh/g could be predoped in a short period of time.

To the mixture of the predoped PAHs, acetylene black, and propylene carbonate obtained above, for 100 parts by weight of the PAHs contained in the mixture, PVDF (polyvinylidene fluoride) was added in an amount of 10 parts by weight and propylene carbonate was added in an amount of 73 parts by weight. By mixing these, an applicable slurry was obtained (slurry preparation step). The obtained slurry was applied to a copper foil 18 μm thick (application step), to be subsequently dried on a 90° C. hot plate for 10 minutes (drying step), whereby a predoped-type electrode was obtained. It should be noted that two evaluation electrodes were punched out. One of them was used in an electrochemical measurement, and the other was dried while the weight thereof was measured on a 120° C. hot plate. The amount of the solvent contained in the electrode was calculated based on the difference between the weight when the weight reduction stopped and the weight before drying. The thickness of the obtained electrode was 52 μm, and the amount of the solvent contained in the electrode was 18% relative to the weight of the PAHs. These steps were performed in an argon dry box in which the water content was not more than 1 ppm.

(Electrochemical Measurement)

The obtained predoped-type electrode (diameter: 17 mm) and lithium metal as a counter electrode were used. The electrolytic solution was a solvent consisting of ethylene carbonate and methyl ethyl carbonate mixed at a weight ratio of 3:7, in which $LiPF_6$ was dissolved at a concentration of 1 mol/L. Then, doping/dedoping of lithium was electrochemically performed. The initial efficiency was 108%, which was an increase compared to the case where predoping was not performed. Thus, it was confirmed that a predoped-type electrode can be obtained by the method of the present invention.

Example 22

In the same manner as that in Example 1 except that the drying condition in the drying step was set to 120° C. for 10 minutes, a predoped-type electrode was obtained. The thickness of the obtained electrode was 86 μm, and the amount of the solvent contained in the obtained electrode was not higher than 1% relative to the weight of the PAHs. Electrochemical measurement was performed on the obtained predoped-type electrode, using the above method. The initial efficiency was 89%, which was an increase compared to the case where predoping was not performed. Thus, it was confirmed that a predoped-type electrode can be obtained by the method of the present invention. These steps were performed in an argon dry box in which the water content was not more than 1 ppm.

Example 23

To the mixture of the predoped PAHs, acetylene black, and propylene carbonate obtained in Example 21, for 100 parts by weight of the PAHs contained in the mixture, a PVDF-HFP copolymer was added in an amount of 7 parts by weight, and propylene carbonate was added in an amount of 60 parts by weight. By mixing these, an applicable slurry was obtained (slurry preparation step). The obtained slurry was applied to a copper foil 18 μm thick (application step), to be subsequently dried on a 90° C. hot plate for 10 minutes (drying step), whereby a predoped-type electrode was obtained. The thickness of the obtained electrode was 80 μm, and the amount of solvent contained in the electrode was 17% relative to the weight of the PAHs. These steps were performed in an argon dry box in which the water content was not more than 1 ppm.

(Electrochemical Measurement)

The obtained predoped-type electrode was punched to have a diameter of 17 mm, and lithium metal was used as a counter electrode. The electrolytic solution was a solvent consisting of ethylene carbonate and methyl ethyl carbonate mixed at a weight ratio of 3:7, in which $LiPF_6$ was dissolved at a concentration of 1 mol/L. Then, doping/dedoping of lithium was electrochemically performed. The initial efficiency was 108%, which was an increase compared to the case where predoping was not performed. Thus, it was confirmed that a predoped-type electrode can be obtained by the method of the present invention.

INDUSTRIAL APPLICABILITY

The present invention proposes a novel method for lithium predoping and a predoped-type electrode production method using the same, which are important for increasing the energy density and output of lithium ion batteries, and for developing lithium ion capacitors. Compared to hitherto known predoping methods that are performed in a cell, the present invention allows a simple method and a uniform predoping in a short period of time, in which a lithium-dopable material and lithium metal are mixed together in the presence of a solvent. The present invention can be performed in a facility that is used for ordinary battery or capacitor production steps. The present invention is a basic and useful technique for developing next-generation electric energy storage devices that require a predoping technique and that use metal oxides, high-capacity materials such as polyacene-based materials, and high-power materials.

The invention claimed is:
1. A method for lithium predoping comprising:
   kneading a lithium-dopable material and a lithium metal foil having a thickness of 0.005 mm to 1 mm, finely-cut pieces of a lithium metal foil having a thickness of 0.005 mm to 1 mm, or lithium metal granules or powder having a particle diameter of 0.005 mm to 1 mm together in the presence of a solvent before forming an electrode, wherein the solvent does not comprise an electrolyte salt.

2. The method for lithium predoping according to claim 1, wherein the solvent reacts with neither the lithium metal nor a material doped with lithium, and the boiling point of the solvent is not lower than 150° C.

3. The method for lithium predoping according to claim 1, wherein the solvent is at least one member selected from the group consisting of cyclic carbonates, lactones, and sulfolanes.

4. An electrode production method that uses the method for lithium predoping according to claim 1, wherein an electrode is produced in an atmosphere whose water content is not more than 30 ppm.

5. An electric energy storage device using an electrode obtained by the electrode production method according to claim 4.

6. An electrode production method that uses the method for lithium predoping according to claim 1, wherein
the lithium-dopable material comprises an amount of solvent that is not less than 10% relative to the weight of the material, and
an electrode is produced in an atmosphere whose water content is not more than 100 ppm.

7. An electric energy storage device using an electrode comprising a material doped with lithium by the predoping method according to claim 1.

8. A predoped-type electrode production method comprising:
[1] predoping and slurry preparation steps of kneading a lithium-dopable material and a lithium metal foil having a thickness of 0.005 mm to 1 mm, finely-cut pieces of a lithium metal foil having a thickness of 0.005 mm to 1 mm, or lithium metal granules or powder having a particle diameter of 0.005 mm to 1 mm together in the presence of a solvent before forming an electrode, wherein the solvent does not comprise an electrolyte salt, to prepare an applicable slurry;
[2] an application step of applying the slurry to a current collector; and
[3] a drying step of drying the slurry applied to the current collector.

9. The predoped-type electrode production method according to claim 8, wherein
the predoping and slurry preparation steps comprise:
[1-1] a predoping step of kneading a lithium-dopable material and lithium metal together in the presence of a solvent before forming an electrode, to dope the lithium-dopable material with lithium; and
[1-2] a slurry preparation step of adding a binder to a mixture from the previous step, and evaporating the solvent from or adding a solvent to the mixture, to prepare an applicable slurry.

10. The predoped-type electrode production method according to claim 8, wherein the drying step is performed in an atmosphere whose water content is not more than 30 ppm.

11. The predoped-type electrode production method according to claim 8, wherein in the drying step, the drying is performed in an atmosphere whose water content is not more than 100 ppm, such that the content of the solvent becomes not higher than 30% but not lower than 10% relative to the lithium-dopable material.

* * * * *